(12) United States Patent
Benoit et al.

(10) Patent No.: US 8,197,939 B2
(45) Date of Patent: Jun. 12, 2012

(54) METHOD FOR PRODUCING A FLEXIBLE COMPOSITE ELASTOMERIC POLYURETHANE SKIN

(75) Inventors: Kristof Benoit, Waregem (BE); Peter De Wilde, Wetteren (BE); Geert Van Houcke, Aalst (BE); Koen Vanlandschoot, Wetteren (BE); Yvan Vanluchene, Waregem (BE); Hugo De Winter, Kalken (BE)

(73) Assignee: Recticel Automobilsysteme GmbH, Rheinbreitbach (DE)

( * ) Notice: Subject to any disclaimer, the term of this patent is extended or adjusted under 35 U.S.C. 154(b) by 611 days.

(21) Appl. No.: 12/302,693

(22) PCT Filed: May 30, 2006

(86) PCT No.: PCT/EP2006/062748
§ 371 (c)(1),
(2), (4) Date: Mar. 24, 2009

(87) PCT Pub. No.: WO2007/137623
PCT Pub. Date: Dec. 6, 2007

(65) Prior Publication Data
US 2009/0324941 A1  Dec. 31, 2009

(51) Int. Cl.
*B32B 27/40* (2006.01)
*B05D 1/36* (2006.01)
(52) U.S. Cl. .................. 428/423.3; 427/427.4
(58) Field of Classification Search ............ 428/423.3, 428/423.1; 427/427.4
See application file for complete search history.

(56) References Cited

U.S. PATENT DOCUMENTS

| | | | |
|---|---|---|---|
| 5,885,662 A * | 3/1999 | Gardner, Jr. ............... 427/426 |
| 5,962,142 A | 10/1999 | Tachi et al. |
| 7,691,480 B1 * | 4/2010 | Stearns ..................... 428/423.3 |
| 7,842,207 B2 * | 11/2010 | Bosman et al. ............ 264/46.5 |
| 2004/0242765 A1 | 12/2004 | Munzmay et al. |
| 2006/0008622 A1 | 1/2006 | Cowelchuk et al. |
| 2006/0091574 A1 | 5/2006 | Mellentine et al. |

FOREIGN PATENT DOCUMENTS

| | | |
|---|---|---|
| AU | 56248/73 A | 5/1973 |
| EP | 0 339 848 A1 | 11/1989 |
| EP | 0 379 246 A2 | 7/1990 |
| WO | 2004/000905 A1 | 12/2003 |

* cited by examiner

Primary Examiner — Thao T. Tran
(74) Attorney, Agent, or Firm — Sughrue Mion, PLLC

(57) ABSTRACT

The present invention relates to a method for producing a flexible elastomeric composite polyurethane skin comprising a first and a second flexible polyurethane layer obtained by spraying a first and a second polyurethane reaction mixture onto one another. The first reaction mixture is an aliphatic polyurethane reaction mixture which is free of lead and formulated to produce a polyurethane elastomer having a flexural modulus smaller than 35 MPa. The second reaction mixture is an aromatic polyurethane reaction mixture producing a polyurethane elastomer having a smaller flexural modulus. The thickness of the aliphatic polyurethane layer could be made so small with respect to the thickness of the aromatic polyurethane layer that the composite skin has an average flexural modulus smaller than 30 MPa. Notwithstanding the lower reactivity of the aliphatic polyurethane reaction mixture, especially when using a higher NCO-index to reduce the "rubbery feel" and the emission of VOCs and/or a flexibiliser to achieve a higher flexibility, sufficiently short cycle times can be achieved due to the accelerated curing observed when spraying the aromatic polyurethane sufficiently early against the aliphatic polyurethane layer.

24 Claims, 1 Drawing Sheet

METHOD FOR PRODUCING A FLEXIBLE COMPOSITE ELASTOMERIC POLYURETHANE SKIN

The present invention relates to a method for producing a flexible elastomeric composite polyurethane skin comprising a first and a second flexible polyurethane layer which adhere to one another. The polyurethane layers have respectively a first and a second flexural modulus and the skin composed of these two layers an average flexural modulus which is smaller than 30 MPa, preferably smaller than 25 MPa and more preferably smaller than 20 MPa. The first polyurethane layer is obtained by spraying a first polyurethane reaction mixture onto a mould surface and the second polyurethane layer by spraying a second polyurethane reaction mixture onto at least a portion of the layer of the first polyurethane reaction mixture. Since aromatic polyisocyanates enable to achieve more flexible polyurethane elastomers than aliphatic polyisocyanates, the second polyurethane reaction mixture comprises at least one aromatic polyisocyanate.

Polyurethane skins are used mainly in interior trim parts of automotive vehicles, more particularly in instrument panels, door panels, consoles, glove compartment covers, etc. In such applications the polyurethane skin is adhered to a rigid substrate by means of an intermediate semi-rigid backfoam layer, which is situated between the elastomeric skin and the substrate. This backfoam layer has a density which is lower than 200 kg/m$^3$ and which is usually comprised between 120 and 180 kg/m$^3$. The presence of such backfoam layer enables to indent the polyurethane skin resiliently so that a soft touch is provided to the trim part. An essential feature of the elastomeric polyurethane skin is in this respect that it has to be sufficiently flexible, i.e. it should have a flexural modulus which is at least smaller than 30 MPa.

Suitable polyurethane reaction mixtures for spraying flexible elastomeric polyurethane skins are disclosed for example in EP-B-0 379 246. The compositions disclosed in this patent are based on aliphatic isocyanates and result in light-stable polyurethanes which do not require an in-mould coating (or a post-painting step) to avoid discoloration of the skin. The Colo-Fast® aliphatic polyurethane formulations (composed of a Polyfast® and an Isofast® blend: trademarks of Recticel) which were produced according to the teachings of this patent, enabled to achieve flexible polyurethane skins having a flexural modulus, measured in accordance with ASTM D790-03, of between 20 and 30 MPa. These formulations further had a relatively short cure time which was typically less than 180 seconds, i.e. the skins produced with these formulations had built up a sufficient green strength within such a cure time so that they could be removed from the mould surface without producing remaining deformations of the skin.

A problem with these aliphatic polyurethane formulations is however that the organolead catalysts which were used therein are or will be forbidden in the future because of environmental regulations. Alternative formulations are now available wherein the organolead catalyst is replaced for example by a combination of an organobismuth and an organotin catalyst, and optionally further in combination with an organozinc catalyst (see for example WO 2004/000905). Although such catalyst combinations also allow to achieve cure times of 180 seconds or less, they produce a somewhat different polyurethane network resulting in stiffer polyurethane skins, more particularly in polyurethane skins having a flexural modulus of about 40 MPa or even higher.

A further drawback of replacing the organolead catalyst by other organometal catalysts is that also the emission of volatile organic compounds from the polyurethane elastomer is increased thereby. As disclosed in WO 2004/000905, the emission can be reduced by using special organobismuth or organotin catalysts wherein the metal atom is bonded to long chain organic groups such as oleyl, linoleyl or linolenyl groups. In practice however the use of these catalysts may give processing problems due to a lower compatibility in the polyol blend wherein they are added. The emission of volatile organic compounds can further be reduced by increasing the NCO-index which results however in stiffer polyurethane elastomers, having for example a flexural modulus of about 55 MPa.

Instead of producing the polyurethane skins from aliphatic polyurethane formulations, it is also possible to produce them from aromatic polyurethane formulations, i.e. from polyurethane formulations the isocyanate component of which comprises an aromatic instead of an aliphatic polyisocyanate. As disclosed for example in EP-B-1 079 962 such aromatic polyurethane formulations have important advantages over aliphatic polyurethane formulations. Aromatic polyurethane formulations produce polyurethane elastomers having more particularly better physical properties such as higher tensile and tear strengths and better elongation and "cold flex" capability. They are also cheaper and have faster cure rates and consequently shorter demoulding times than aliphatic polyurethane formulations. Consequently, they do not require an organolead catalyst for achieving a short demoulding time. Moreover, they do not release volatile organic compounds (VOCs) or at least considerably less than aliphatic polyurethanes.

A drawback of aromatic polyurethane elastomers is however that they become less stable after prolonged exposure to light so that they have to be masked from direct exposure to sunlight by means of an outer coating layer. This coating layer is preferably an in-mould coating layer which is applied onto the mould surface before spraying the aromatic polyurethane formulation thereon. The coating layer is either solvent or water based and has a thickness of less than about 40 microns. Solvent based in-mould coatings have the drawback of releasing volatile organic compounds (VOCs) whilst water based in-mould coatings require considerably longer dry times even when using a heat source as disclosed in EP-B-1 079 962.

Instead of making the polyurethane skin of one polyurethane layer, it is also known from different patent applications, in particular from US 2006/0008622 and US 2006/0091574, to make composite polyurethane skins comprising an outer polyurethane layer, having a density higher than 850 kg/m$^3$, and an expanded polyurethane layer, having a density of between 100 and 750 kg/m$^3$. The expanded polyurethane layer comprises an aromatic polyurethane elastomer whilst the outer polyurethane layer may either be made of an aromatic or of an aliphatic polyurethane elastomer. When the outer polyurethane layer is made of an aromatic polyurethane elastomer, it still has to be provided with a coating which inhibits sunlight and/or other ultraviolet light from reaching the outer polyurethane layer. Although these prior art documents do not mention any flexibility of the composite polyurethane skins, it will be clear that when a highly flexible skin is to be produced, in particular a skin having a flexural modulus smaller than 30 MPa or even still smaller, a skilled person will make the composite skins disclosed in these US patent applications entirely of aromatic polyurethane elastomers.

An object of the present invention is now to provide a new method for producing a composite polyurethane skin which has a high flexibility, i.e. a flexural modulus which is smaller than 30 MPa or even still smaller, and which is free of lead, but which does not require a coating layer to render the composite polyurethane skin light-stable.

To this end the method according to the invention is characterised in that:
- the first polyurethane reaction mixture used to produce the first polyurethane layer is composed of components comprising at least an isocyanate component, isocyanate-reactive components and a catalyst component, the isocyanate component being composed of at least one isocyanate having at least two NCO-groups which are not directly attached to an aromatic group, and the catalyst component being substantially free of lead;
- the flexural modulus of the first polyurethane layer is larger than said average flexural modulus but smaller than 35 MPa and preferably smaller than 30 MPa;
- the flexural modulus of the second polyurethane layer is smaller than the average flexural modulus of the composite skin; and
- the first and the second polyurethane reaction mixtures are sprayed in such amounts that the first polyurethane layer has a first areal weight larger than 0.1 kg/m² and the second polyurethane layer a second areal weight larger than 0.3 kg/m², the ratio between the first and the second areal weight being further selected so that said average flexural modulus is achieved.

Due to the fact that the first or outer polyurethane layer is an aliphatic polyurethane layer it does not require a coating to render it light-stable. Consequently, it is not necessary to provide separate spray equipment for spraying the in-mould coating. Furthermore, there is no additional cycle time needed to flash off the solvent (which may be water-based) of the in-mould coating, so that the first polyurethane reaction mixture and subsequently also the second reaction mixture can be immediately sprayed. According to the invention it has been found that even with a relatively stiff aliphatic polyurethane layer, having a flexural modulus of up to 35 MPa, a composite elastomeric polyurethane skin can be produced which has a flexural modulus lower than 30 MPa or even lower by combining the aliphatic polyurethane layer with a more flexible aromatic polyurethane layer and by making the aliphatic polyurethane layer sufficiently thin with respect to the aromatic polyurethane layer. It has also been found that the emission of volatile organic compounds from the composite polyurethane skin is considerably reduced compared to a polyurethane skin having the same thickness but made entirely of the aliphatic polyurethane elastomer.

In a preferred embodiment of the method according to the invention, spraying of the second polyurethane reaction mixture is started at the latest 90 seconds, preferably at the latest 60 seconds after having stopped spraying the first polyurethane reaction mixture.

It has been found quite surprisingly that when spraying the second, aromatic polyurethane reaction mixture onto the first reaction mixture before it is cured, the curing thereof is accelerated. A possible explanation for this finding is that the more reactive components of the second polyurethane reaction mixture may penetrate into the layer of the first polyurethane reaction mixture so that somewhat interpenetrating polyurethane networks are formed. An important advantage of the accelerated curing of the first polyurethane layer is that less reactive polyurethane formulations for this layer can be used without increasing the production cycle time. Indeed, spraying and curing of the second aromatic polyurethane layer requires anyway also a minimum amount of time (for example 180 seconds or even somewhat more). A skilled person is thus not or at least less hampered by a maximum cure time when changing the polyurethane formulation to make the aliphatic polyurethane elastomer more flexible and/or to reduce the emission thereof. As a matter of fact, a more flexible polyurethane formulation requires less crosslinking and is thus generally less reactive than stiffer polyurethane formulations. As to the emission, it is possible to simply reduce the amount of organometal catalysts in the PU reaction mixture to produce the first layer, so that a lower emission of volatile organic compounds is achieved. Some of the organometal catalysts, in particular the organotin catalyst, can even be omitted.

In an advantageous embodiment of the method according to the invention, the isocyanate-reactive components of the first polyurethane reaction mixture comprise a flexibiliser which reduces the flexural modulus of the first polyurethane layer. The flexibiliser comprises at least one isocyanate-reactive group and optionally one or more further isocyanate-reactive groups which are less reactive than said isocyanate-reactive group so that at least a portion of them do not react with the isocyanate groups during the curing of the polyurethane reaction mixture, the flexibiliser comprising more preferably a monofunctional flexibiliser comprising only one isocyanate-reactive group. Although the flexibiliser is usually added to the polyol blend, it can also be added to the isocyanate blend. Since the amount of flexibiliser is considerably smaller than the amount of polyisocyanate, most of the produced addition product of polyisocyanate and flexibiliser will still have free NCO-groups so that it will be built in the polyurethane network.

The presence of a flexibiliser increases the cure time of the reaction mixture but, when spraying the second, aromatic polyurethane reaction mixture sufficiently early, the cure time is reduced by the interaction between both reaction mixtures as explained hereabove.

In a further advantageous embodiment of the method according to the invention, the first polyurethane reaction mixture contains an organobismuth catalyst and is either substantially free of tin or contains less than 600, preferably less than 400 and more preferably less than 200 ppm tin.

It has been found that especially the amount of the organotin catalyst can be reduced or that the organotin catalyst can even be omitted since the organotin catalyst is mainly effective to provide for an effective curing at the end of the polymerisation reaction whilst the organobismuth catalyst provides for a quick initial curing.

In still a further advantageous embodiment of the method according to the invention, the isocyanate component and the isocyanate-reactive components of said first polyurethane reaction mixture are allowed to react according to an NCO-index higher than 90, preferably higher than 95, more preferably higher than 100 and most preferably higher than 105, the NCO-index being preferably lower than 120.

Such higher NCO-indexes also increase the cure time of the reaction mixture. They however enable to achieve a more perfect polyurethane network thereby reducing the release of volatile compounds out of the polyurethane elastomer. Higher NCO-indexes have now been found to reduce also the undesired "rubbery" feel of the polyurethane elastomer. Due to the fact that they have a negative effect on the flexibility of the polyurethane elastomer, they are preferably used in combination with a flexibiliser. Of course this leads to even longer cure times but, as explained hereabove, the cure times can again easily be reduced by spraying the second polyurethane reaction mixture sufficiently early onto the back of the layer of the only partially cured first polyurethane reaction mixture.

The present invention also relates to a flexible elastomeric composite polyurethane skin which can be obtained by the method according to the invention.

In a preferred embodiment of the polyurethane skin according to the invention, the second polyurethane skin is interfacially chemically bonded via urethane bonds to the first polyurethane layer.

This is the result of the fact that the second polyurethane reaction mixture is sprayed onto the layer of the first polyurethane reaction mixture when this first polyurethane reaction mixture still contains some reactive isocyanate or isocyanate-reactive groups. In this way, both polyurethane layers are very strongly connected to one another.

In a preferred embodiment of the polyurethane skin according to the invention, the second polyurethane layer has a density of less than 600 kg/m$^3$, preferably of less than 550 kg/m$^3$ and more preferably of less than 500 kg/m$^3$ and has a Shore A hardness smaller than 30, preferably smaller than 25 and more preferably smaller than 20.

In combination with the high flexibility of the first or outer polyurethane layer, such low densities and Shore A hardnesses of the second layer enable to achieve a unique skin touch or high quality feeling. More particularly a so-called "Schiebe-Effekt" (German expression indicating the possibility of a shearing motion) can be achieved, which is required to obtain a skin which has the feel of natural leather, i.e. a so-called "leather touch".

Other particularities and advantages of the invention will become apparent from the following description of some particular embodiments of the method and of the composite polyurethane skin according to the present invention. The reference numerals used in this description relate to the annexed drawings wherein:

FIG. 1 schematically illustrates the step of spraying the first polyurethane reaction mixture onto a mould surface;

The invention relates to a method for producing a flexible elastomeric composite polyurethane skin which has an average areal weight (determined by dividing the total mass of the skin by the surface area of its front surface) of at least 0.6 kg/m$^2$ and an average flexural modulus which is smaller than 30 MPa, preferably smaller than 25 MPa and more preferably smaller than 20 MPa. This flexural modulus, and the flexural moduli of the different elastomeric polyurethane layers, are measured in accordance with ASTM D790-03. For the composite skin, an average flexural modulus is indicated since the thickness of the composing layers may differ somewhat from place to place resulting in different flexural moduli (by determining the average flexural modulus, the surface area of the areas having one flexural modulus has to be taken into account, i.e. the average is a surface area weighted average).

Figure 1:
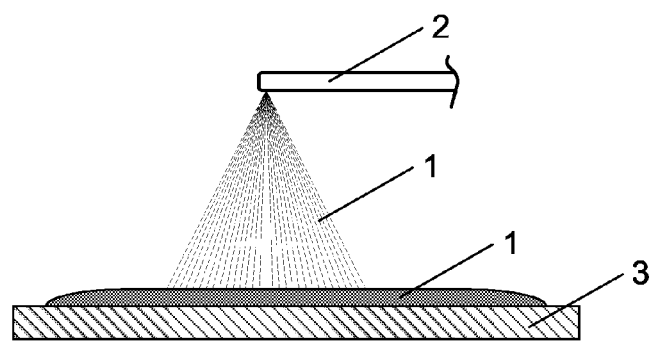
Figure 2:
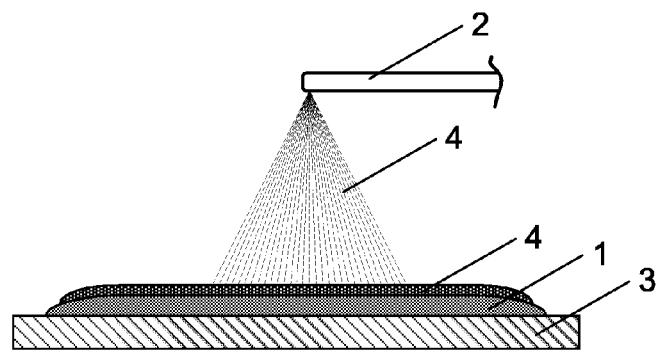
FIG. 2 illustrates the step of spraying the second, aromatic polyurethane reaction mixture onto the sprayed layer of the first reaction mixture.
Figure 3:
FIG. 3 illustrates the composite polyurethane skin removed from the mould surface after curing of the two polyurethane reaction mixtures.
Figure 4:
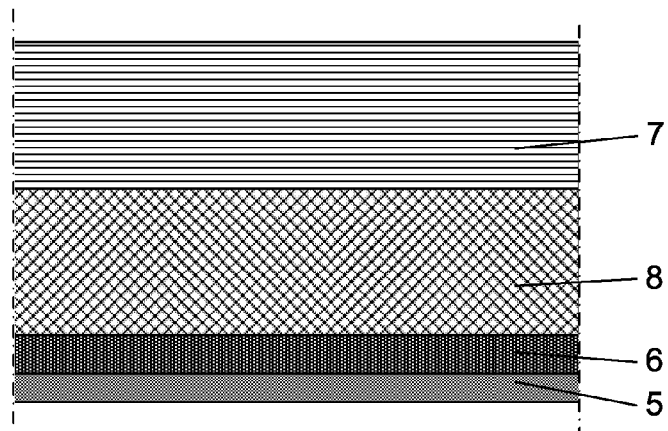
FIG. 4 shows a schematic cross-sectional view through a trim part comprising the composite polyurethane skin adhered by means of an intermediate backfoam layer to a rigid substrate.

The method for producing the composite polyurethane skin comprises the step of spraying a layer of a first polyurethane reaction mixture 1 by means of a spray gun 2 onto a mould surface 3 (FIG. 1) and the step of spraying a second polyurethane reaction mixture 4 onto at least a portion of the layer of the first reaction mixture 1 (FIG. 2). This can be done by means of the same spray gun 2 or by means of a different spray gun. The second reaction mixture 4 can also be sprayed onto portions of the mould surface 3 which were not covered with the first reaction mixture. This can for example be done in areas of the skin which will not be visible or which will even be cut away. In this way, the cost of the skin can be reduced since the second polyurethane reaction mixture is less expensive than the first reaction mixture. The mould surface is preferably heated to accelerate the curing of both reaction mixtures, in particular to a temperature of between 30 and 100° C. and preferably to a temperature of between 60 and 65° C. After the two reaction mixtures 1, 4 are cured, i.e. after the composite skin has a sufficient green strength, it can be removed from the mould surface. The thus produced composite skin (see FIG. 3) comprises a first elastomeric polyurethane layer 5 and a second elastomeric polyurethane layer 6 which adheres to the first polyurethane layer 5.

Before removing the composite skin from the mould surface 3, it is also possible to subject the skin to a so-called direct backfoaming process. In such a process a polyurethane foam formulation is poured or otherwise applied onto the back of the second polyurethane layer 6 and is allowed to foam between the skin and a rigid substrate 7 so that the skin is adhered to the rigid substrate through this intermediate foam layer 8. This backfoam layer is preferably a semi-rigid foam layer so that it forms a sufficient solid cushion in front of the rigid substrate to provide some protection for the car driver and any passenger in case of crashes.

Spraying of the two polyurethane reaction mixtures can be done by means of the techniques and spray nozzles disclosed in EP-B-0 303 305 and in EP-B-0 389 014. The two reaction mixtures are substantially solvent free or contain only a very limited solvent amount, in particular less than 5% (by weight) and preferably less than 3% (by weight). An essential feature of the method according to the present invention is that the first polyurethane reaction mixture 1 is composed of components comprising at least an isocyanate component, isocyanate-reactive components and a catalyst component and that the isocyanate component is composed of at least one isocyanate having at least two NCO-groups which are not directly attached to an aromatic group. In this way, the polyurethane elastomer is a so-called aliphatic polyurethane elastomer. A further essential feature is that the catalyst component is substantially free of lead. This means that no lead is present in the produced polyurethane elastomer or only some traces which are not detectable by the conventional techniques, in particular traces of less than 5 ppm, more particularly of less than 1 ppm of the element lead.

In contrast to the first polyurethane reaction mixture 1, the second polyurethane reaction mixture 4 comprises at least one aromatic polyisocyanate. Preferably the isocyanate component of the second polyurethane reaction mixture exclusively comprises such an aromatic polyisocyanate or polyisocyanates, but it is also possible that one or more aliphatic polyisocyanates are also present. Moreover, it is possible that the composition of the second polyurethane layer changes in a direction away from the first layer so that closer to the first layer it comprises more aliphatic isocyanate residues than on its side directed away from the first layer. A gradual change may even be achieved when replacing the aliphatic isocyanate component of the first layer gradually by the aromatic isocyanate component during the spray process of the second layer. It is furthermore possible to change only the isocyanate blend when spraying the second layer, or changing as well the isocyanate as the polyol blend, either gradually or not gradually, when spraying the second layer.

The first, aliphatic polyurethane reaction mixture 1 is formulated in such a manner that the first polyurethane layer 5 has a flexural modulus smaller than 35 MPa and preferably smaller than 30 MPa. Due to the fact that the second, aromatic polyurethane layer 6 has a lower flexural modulus, the average flexural modulus of the composite skin is situated between the two flexural moduli of both polyurethane layers 5 and 6. The average flexural modulus of the composite skin can thus be controlled by selecting the ratio between the thickness of the first polyurethane layer and the thickness of the second polyurethane layer or more particularly between the areal weight of the first polyurethane layer 5 and the areal weight of the second polyurethane layer 6. The first or outer polyurethane layer 5 should have an areal weight of at least 0.1 kg/m$^2$ to provide a sufficient covering of the second layer whilst the second polyurethane layer 6 should have an areal weight of at least 0.3 kg/m$^2$ in view of increasing the flexibility of the skin and also in view of reducing the production cycle time (due to the shorter cure time of this aromatic layer and the effect of this layer on the curing of the first polyurethane reaction mixture). The areal weight of the first polyurethane layer 5 is preferably larger than 0.2 kg/m$^2$, more preferably larger than 0.3 kg/m$^2$ and the areal weight of the second polyurethane layer 6 is preferably larger than 0.4 kg/m$^2$, more preferably larger than 0.5 kg/m$^2$.

In view of accelerating the curing of the first reaction mixture 1, spraying of the second polyurethane reaction mixture 4 is preferably started at the latest 90 seconds, more preferably at the latest 60 seconds and most preferably at the latest 40 seconds after having stopped spraying the first polyurethane reaction mixture. When a different spray equipment is used for spraying the second reaction mixture, spraying thereof can even be started before the first polyurethane layer is completely sprayed. On the other hand, when spraying with the same spray gun 2 which is connected via valves to different raw materials, it is possible to switch over without any interruption from the first reaction mixture to the second reaction mixture (optionally gradually). This can be done by changing both the isocyanate and the polyol blend or optionally by changing only the polyol blend. An important advantage of starting to spray the second, more reactive, polyurethane reaction mixture sufficiently early after having sprayed the first, less reactive, polyurethane reaction mixture, is that in this way the curing of the first reaction mixture is accelerated. This enables thus to use even less reactive polyurethane reaction mixtures which have better properties especially with respect to flexibility, emission or fogging, heavy metal content, etc.

The first reaction mixture may comprise in particular the following components:
- A) an isocyanate component composed of at least one isocyanate compound having at least two NCO-groups which are not directly attached to an aromatic group;
- B) isocyanate-reactive components comprising
   - b1) an active hydrogen containing component composed of at least one active hydrogen containing compound having:
      - functional groups comprising primary and/or secondary OH-groups, NH-groups and/or NH$_2$-groups;
      - a nominal functionality of from 2 to 8; and
      - an equivalent weight of between 100 and 4000, preferably of between 500 and 2000;
   - b2) from about 0 to about 30 parts, preferably from about 2 to about 30 parts, per 100 parts of components b1, b2 and b3, of a chain-extender and/or cross-linker component composed of at least one chain-extender and/or of at least one cross-linker having an equivalent weight smaller than 100, the functional groups of which are OH-groups, at least 50% of which are primary OH-groups and the functionality of which is from 2 to 6; and/or
   - b3) an amine-initiator component which forms a co-catalytic system with catalyst component C and which is composed of at least one amine-initiator which has a functionality of 2 to 6 and an equivalent weight lower or equal to 200 and which comprises at least one aliphatic or alicyclic NH$_2$- or NH-group; and
- C) a catalyst component which is substantially free of lead and which comprises at least one organobismuth (III) catalyst.

In addition to these components, the first reaction mixture will usually comprise pigments and/or colorants.

The isocyanate component may comprise one isocyanate compound or a mixture of isocyanate compounds. The suitable isocyanate compounds can be very different. An essential feature of the isocyanate compounds is that they comprise at least two NCO-groups which are not directly attached to an aromatic group. In this way the obtained polyurethane material can be made light-stable. The isocyanate component comprises preferably IPDI (isophoronediisocyanate) monomers or trimers or a mixture thereof, the IPDI monomer/trimer mixture having preferably an NCO content of between 24.5 and 34% by weight. Optionally, an isocyanate prepolymer, wherein a portion of the NCO-groups has already reacted with an active hydrogen containing compound, can also be used. Instead of IPDI other "non-aromatic" isocyanates can be used such as TMXDI, HDI, H6XDI and H12MDI or derivatives thereof. These isocyanates are described in EP-B-0 379 246, which description is included herein by way of reference.

The isocyanate-reactive components comprise first of all an active hydrogen containing component. This component is composed of one or more active hydrogen containing compounds which have an equivalent weight of between 100 and 4000 and a nominal functionality of from 2 to 8. This active hydrogen containing compounds are preferably polyether polyols with terminal OH-groups prepared by polyaddition of propylene oxide and/or ethylene oxide on low molecular weight initiators with OH-, NH- and/or NH$_2$-groups and having a functionality of 2 to 8. This functionality corresponds to the nominal functionality of the polyether polyol. Preferably the nominal functionality of the active hydrogen containing compound is from 2 to 4. In view of the reactivity of the active hydrogen containing compound, preferably at least 50%, and more preferably at least 70% of the isocyanate reactive OH-groups are primary OH-groups.

Instead of, or in addition to, the OH-groups, the active hydrogen containing compounds may also contain isocyanate-reactive NH- or NH$_2$-groups. Examples of such compounds are the so-called Jeffamines of Texaco.

Other types of active hydrogen containing compounds are the polyester polyols forming ester condensation products of dicarboxylic acids with low molecular weight polyalcohols having a functionality of 2 to 8, preferably of 2 to 4, corresponding to the nominal functionality of the polyester polyol.

Further suitable active hydrogen containing compounds are the polytetramethylene ether glycols (PTMG), which are polytetrahydrofuran with 100% primary OH-groups, and which have a nominal functionality of 2 and a hydroxyl number of 35 to 200.

The isocyanate-reactive components further comprise a cross-linker and/or chain-extender component composed of at least one cross-linker and/or of at least one chain-extender, the functional groups of which are OH groups. The chain-extender and/or the cross-linker has an equivalent weight smaller than 100. The presence of such a cross-linker and/or chain-extender is normally but not always required. It is used in an amount of 0 to about 30 parts, preferably from about 2 to about 30 parts, per 100 parts of components b1, b2 and b3.

Typical preferred cross-linkers or chain extenders with only active OH groups, which have a functionality of 2 to 4, a hydroxyl number higher than 250 and a primary OH group concentration higher than 50%, are ethylene glycol, propanediol, butanediol, pentanediol, hexanediol, glycerin, trimethylolpropane, triethanolamine, trimethylolethane, pentaerythrol, bisphenol A and cyclohexanedimethanol, and also possible addition products of all these examples with less than 5 or with 5 moles ethylene oxide and/or propylene oxide per mole chain extender/cross-linker.

The isocyanate-reactive components finally may comprise an amine-initiator component which forms a co-catalytic system with catalyst component C. Such initiators are described i.a. in U.S. Pat. No. 4,150,206 and U.S. Pat. No. 4,292,411, provided that a minimum functionality of 2 is required.

Aliphatic or alicyclic alkanolamines or polyamines, having an amino group not directly attached to an aromatic ring are generally considered in this respect. The number of NH- and/or $NH_2$-groups is at least 2, if no OH-groups are present and, at least 1 if OH-groups are present. The total number of reactive groups, formed by —NH, —$NH_2$ or —OH, mostly varies between 2 and 5.

Typical preferred compounds, notably aliphatic compounds having a functionality of 2 to 4, are the following ones: monoethanol-amine, diethanolamine, diisopropanolamine, ethylenediamine, isophoronediamine, N,N'-dimethyl (diethyl)-ethylenediamine, 2-amino-2-methyl (or ethyl)-1-propanol, 2-amino-1-butanol, 3-amino-1,2-propanediol, 2-amino-2-methyl(ethyl)-1,3-propanediol.

"Jeffamines" (Texaco) (propylene oxide addition products having mainly terminal primary $NH_2$ or secondary NH groups—functionality 2 to 3). Addition products of propylene oxide and/or ethylene oxide on ethylenediamine initiator (2 to 8 moles/mole ethylenediamine).

The composition can also contain appropriate additives, including, by way of example and without limitation, any combination of the following: heat and ultraviolet light stabilizers, pH stabilizers, antioxidants, dulling agents, surfactants, carbon black, thixotropic agents (e.g., amorphous silica), and fillers such as clay particles.

The above mentioned components of the light-stable polyurethane formulation are already described more into detail in EP-B-0 379 246, which description is included herein by way of reference.

The catalyst component is as described free of lead but may otherwise contain all the catalysts as disclosed in EP-B-0 379 246. These catalysts include organobismuth catalysts, organotin catalysts (including Sn(IV) carboxylates, dialkyldistannoxane dicarboxylates and alkyltinhalides) and the so-called alkaline catalysts (such as diazobicyclo-alkenes). Special organometal catalysts, including also organozinc catalysts, which can be used to reduce the emission of volatile organic compounds are further disclosed in WO 2004/000905. The description of these catalysts is also incorporated herein by reference.

In the method according to the invention use is preferably made of at least an organobismuth (III) catalyst, more particularly of bismuth octoate, bismuth neodecanoate or bismuth oleate. Although it is also possible to use an organotin catalyst, the amount of this catalyst can be reduced in view of the accelerated curing provided by the early spraying of the second polyurethane reaction mixture. In order to reduce the amount of heavy metals in the polyurethane elastomer and/or the emission of volatile organic compounds, the first polyurethane reaction mixture is either substantially free of tin or contains less than 600, preferably less than 400 and more preferably less than 200 ppm of the element tin.

Also in view of reducing the emission, the isocyanate component and the isocyanate-reactive components are mixed in such a ratio with one another that the NCO-index of the first polyurethane reaction mixture is higher than 90, preferably higher than 95, more preferably higher than 100 and most preferably higher than 105, the NCO-index being preferably lower than 120. It has also been found that with such a high NCO-index, the "rubbery feel" of the skin can also be reduced. A drawback of such high NCO-values is however the increased cure time and the reduced flexibility.

To achieve the required flexibility of the first polyurethane layer, the isocyanate-reactive components of the first polyurethane reaction mixture preferably comprise at least one flexibiliser which reduces the flexural modulus of the first polyurethane layer and which comprises at least one isocyanate-reactive group. This group ensures that the flexibiliser is built-in in the polyurethane network so that it cannot migrate. The most suitable flexibilisers are monofunctional and comprise only one isocyanate-reactive group. Other flexibilisers may however contain one or more further isocyanate-reactive groups which are less reactive than said isocyanate-reactive group so that at least a portion of them do not react with the isocyanate groups during the curing of the first polyurethane reaction mixture. Flexibilisers which appear to be quite effective comprise a polyethylene glycol chain and include in particular a polyethylene glycol monoalkyl ether, more particularly polyethylene glycol monomethyl ethers having a molecular weight higher than 200, preferably higher than 300 and more preferably higher than 400, but lower than 1000, preferably lower than 900 and more preferably lower than 800. The flexibiliser is preferably used in an amount of at least 3, preferably at least 5 and more preferably at least 7 parts by weight per 100 parts by weight of the isocyanate-reactive components, the amount of flexibiliser being however preferably smaller than 20, more preferably smaller than 18 and most preferably smaller than 16 parts by weight per 100 parts by weight of the isocyanate-reactive components.

The flexibiliser is preferably added to the polyol blend. However, it can also be added to the isocyanate blend. In this case, it will first react with a polyisocyanate to form a reaction product comprising at least one free NCO groups, which assure that the flexibiliser is built-in in the polyurethane network. Such a reaction product can also be prepared in advance and added to the isocyanate component.

The composition of the second polyurethane reaction mixture is mainly the same as the above described composition of the first polyurethane composition except for the fact that it contains at least one aromatic polyisocyanate so that it is more reactive and so that it does not have to contain a catalyst or at least a considerably smaller amount thereof. Moreover, although it is possible to include also a flexibiliser in the second reaction mixture, this will generally not be required in view of the higher flexibility which can be achieved by means of aromatic polyisocyanates. Finally, although pigments and/or colorants can also be added to the aromatic polyurethane reaction mixture (for example when spraying in areas containing only a very thin aliphatic polyurethane layer), it is generally not necessary to include such pigments and/or colorants in the aromatic polyurethane reaction mixture.

Exemplary polyisocyanates that can be selected for the aromatic second layer include diisocyanates having aromatic closed-ring structures, such as diphenylmethane diisocyanate prepolymer (MDI prepolymer) or diphenylmethane-4,4'-diisocyanate (MDI), or mixed isomers of MDI or mixtures of the above, which are available from BASF Elastogran (Lupranat), Dow Chemical Company (Isonate), Bayer (Desmodur), or Huntsman (Suprasec).

The above-mentioned non-light-stable aromatic polyisocyanates are very desirable for use in view of their higher reactivity compared to aliphatic polyisocyanates and in view of the better mechanical properties (e.g. tensile strength, elongation, and tear strength) of polyurethane elastomers obtained with these non-light-stable aromatic polyisocyanates.

The first polyurethane reaction mixture is preferably formulated so that the first elastomeric polyurethane layer has an average density of at least 600 kg/m$^3$, preferably of at least 700 kg/m$^3$ and more preferably of at least 800 kg/m$^3$. To reduce the negative effects of the aliphatic outer polyurethane layer on the mechanical properties of the composite skin, its average thickness (determined by dividing its volume by the surface area of its front face) is preferably smaller than 1 mm, more preferably smaller than 0.8 mm and most preferably smaller than 0.6 mm.

The second elastomeric polyurethane layer preferably has an average density of at least 250 kg/m$^3$, more preferably of at least 300 kg/m$^3$ and most preferably of at least 350 kg/m$^3$.

In a first embodiment of the composite polyurethane skin according to the invention, the second polyurethane layer has an average density of at least 600 kg/m$^3$, preferably of at least 700 kg/m$^3$ and more preferably of at least 775 kg/m$^3$. This embodiment is especially intended to achieve a high skin flexibility. Due to the low flexural modulus of the second polyurethane layer, for example a flexural modulus of 15 MPa or even lower, the composite skin has for example a flexural modulus of between 15 and 30 MPa. The composite skin has in this embodiment preferably an average thickness of between 0.8 and 2.0 mm, this average thickness being preferably smaller than 1.6 mm and more preferably smaller than 1.4 mm.

In a second embodiment of the composite polyurethane skin according to the invention, the second polyurethane layer has an average density of less than 600 kg/m$^3$, preferably of less than 550 kg/m$^3$ and more preferably of less than 500 kg/m$^3$. Due to this lower density, the second polyurethane layer has even a higher flexibility so that the composite skin may have for example an average flexural modulus of between 5 and 15 MPa. In this second embodiment, the hardness of the second polyurethane layer is preferably reduced to a Shore A hardness, which is measured in accordance with DIN 53505, smaller than 30, preferably smaller than 25 and more preferably smaller than 20 (if the second polyurethane layer is thinner than 6 mm, two or more layers should be stacked upon one another when measuring the Shore A hardness in accordance with DIN 53505). The second polyurethane layer has further preferably an average thickness of at least 1 mm, preferably of at least 1.5 mm and more preferably of at least 2.0 mm. In this way a unique skin touch and high quality feeling, i.e. a leather touch can be achieved due to the so-called "Schiebe-Effekt" which is produced, especially when the first polyurethane layer is sufficiently thin and flexible. The average thickness of the second polyurethane layer is preferably smaller than 15 mm, more preferably smaller than 10 mm and most preferably smaller than 5 mm.

The reduced density of the second aromatic polyurethane layer can be achieved by adding a chemical blowing agent (such as water) and/or a physical blowing agent (low boiling liquid) to the second reaction mixture. Additionally or alternatively it is also possible to add a gas to the reaction mixture so that it is sprayed in the form of a froth out of the nozzle. This can be done for example as disclosed in WO 2005/000481 by adding a gas such as nitrogen or carbon dioxide to the reaction mixture prior to mixing it in the static mixer or by adding the gas to the polyol and/or to the isocyanate blend.

The invention also relates to the composite skin obtained by the methods described hereabove. Moreover, the invention also relates to a method for producing a flexible elastomeric polyurethane skin layer in the same way as described hereabove for the first polyurethane layer when use is made therein of the flexibiliser, but which polyurethane skin layer does not necessarily need to be part of a composite polyurethane skin but which may form a flexible elastomeric polyurethane skin as such. It is clear that in this latter case, when used as polyurethane skin as such, optionally provided with a backfoam layer by a direct backfoam process, the average thickness may be increased somewhat in view of achieving the desired mechanical skin properties such as tensile strength and tear resistance.

EXAMPLE 1

TABLE 1

Production cycle time of prior art aliphatic PU skin
and of a composite PU skin according to the invention

|  | aliphatic skin (prior art) | composite skin (according to the invention) |
|---|---|---|
| ERA spray time | 30 s | 30 s |
| gun change | 15 s | 15 s |
| pre spray | 3 s | 3 s |
| spray aliphatic PU reaction mixture (14 g/s) | 98 s | 32 s |
| gun change | — | 15 s |
| pre spray | — | 3 s |
| spray aromatic PU reaction mixture (14 g/s) | — | 72 s |
| cure time | 210 s | 90 s |
| Total cycle time | 356 s | 260 s |

In this first example, the total cycle time (seconds) is compared between an aliphatic skin of 1.2 mm thickness (prior art), and a composite skin according to the invention.

After first spraying an external release agent on the mould surface, an aliphatic PU reaction mixture (corresponding to formulation A of Table 3) is sprayed during 98 s at a flow rate of 14 g/s on a mould surface. This leads to a PU skin with an average thickness of about 1.2 mm (density of about 950 kg/m$^3$). This PU reaction mixture needs a cure time of 210 s, which brings the total cycle time to 356 s. The cure time is defined as the time needed to demould the skin without risk of permanent deformation, and is determined according to the "bucket test", which is further described.

In the embodiment according to the invention, the same aliphatic PU reaction mixture is first sprayed during 32 s on the same mould surface at the same flow rate. This leads to a PU skin layer with an average thickness of about 0.4 mm. The spray gun is then changed and immediately thereafter a second aromatic PU mixture is sprayed at the same flow rate (14 g/s) during 72 s on the back of the first (aliphatic) layer, yielding an aromatic skin with an average thickness of about 1.0 mm thickness (density of about 800 kg/m³). This second layer is then cured during 90 s, after which the composite skin is removed from the mould.

As can be seen from Table 1, the total spraying time is comparable in both examples. However, in the embodiment according to the invention, the total cycle time can be reduced from 356 s to 260 s (27% reduction), due to the fact that the cure time of the second (aromatic layer) is much lower compared to the aliphatic skin layer (90 s versus 210 s) and also due to the fact that the curing of the aliphatic PU layer is accelerated by the interaction with the aromatic PU layer. In fact, notwithstanding the fact that the aliphatic PU layer had a cure time of 210 s, it could be demoulded within 180 seconds after having stopped spraying the aliphatic PU layer. The "bucket test" showed that the cure time of the aliphatic PU layer was effectively reduced to even a value below 180 seconds.

Determination of the Cure Time According to the "Bucket Test"

The cure time can be determined by approximation by demoulding the skins at different times after "stop spraying" and the subjection of these skins to the "bucket test". In this "bucket test", the skins are crumpled up directly after demoulding, put in a bucket and left to stand for another 2 hours. Afterwards, the skins are taken out of the bucket, stretched back to full size and evaluated for permanent deformations (dents, creases, pleats, . . . )

The minimum time after "stop spraying" at which the skins can be demoulded and whereby no permanent deformations occur after the "bucket test" is then determined as the (minimum) cure time.

EXAMPLE 2

TABLE 2

Formulations demonstrating the effect of different flexibilisers on the cure time and on the flexibility and other mechanical properties of the PU elastomers (free of lead).

|  | A (ref.) | B | C | D | E | F | G | H |
|---|---|---|---|---|---|---|---|---|
| Polyfast PF 3562 | 108.6 | 108.6 | 108.6 | 108.6 | 108.6 | 108.6 | 108.6 | 108.6 |
| Isofast IF 3462 T | 52.7 | 54.8 | 56.8 | 54.2 | 55.6 | 55.6 | 57.0 | 54.6 |
| Carbowax MPEG350 | 0 | 5 | 10 | 0 | 0 | 0 | 0 | 0 |
| Carbowax MPEG500 | 0 | 0 | 0 | 5 | 10 | 10[(1)] | 15 | 0 |
| Carbowax MPEG750 | 0 | 0 | 0 | 0 | 0 | 0 | 0 | 10 |
| Cure time (s) | 180 | 200 | 210 | 200 | 210 | 200 | 240 | 210 |
| Density (kg/m³) ISO 1183-1 | 990 | 980 | 985 | 1000 | 1025 | 980 | 1025 | 1025 |
| Tensile strength (MPa) DIN/EN/ISO 527-3 | 3.90 | 2.75 | 2.90 | 2.46 | 2.80 | 2.60 | 2.42 | 3.16 |
| Elongation (%) DIN/EN/ISO 527-3 | 75 | 90 | 85 | 90 | 100 | 95 | 110 | 85 |
| Tear resistance (N/mm) DIN 53515 | 4.0 | 3.5 | 3.3 | 2.7 | 3.2 | 3.1 | 2.9 | 3.5 |
| Flexural Modulus (MPa) ASTM D790 | 38 | 24 | 20 | 22 | 18 | 18 | 12 | 27 |

[(1)]parts of flexibiliser added to the isocyanate mix instead of to the polyol blend In Table 2 the effect of the flexibiliser on the cure time and on the flexural modulus of the PU elastomer skin is evident. The polyurethane formulations were free of lead and only contained bismuth octoate and dimethyltindineodecanoate as organometal catalysts. In the examples use was made of a monofunctional flexibiliser, more specifically a methoxy-polyethyleneglycol ($CH_3$—$(OCH_2CH_2)_n$—OH) with different molecular weights. (respectively 350, 500 and 750). This product is commercially available at Dow Chem. Corp.

As can be seen from the cure times, the cure time increases and the flexural modulus decreases with increasing amount of flexibiliser, this means that the elastomeric skin becomes more flexible with increasing amount of flexibiliser.

The increase in cure time can be explained by the fact that the formed polymer network is less perfect and contains dangling chains, giving rise to a much higher sensitivity for dents at too short curing times. Example F shows that the cure time increase is reduced less when the flexibiliser is added to the isocyanate blend.

EXAMPLE 3

TABLE 3

Formulations demonstrating the effect of the NCO-index on the emission and fogging values, on the cure time and on the rubbery feel of the PU elastomers (free of lead).

|  | A | B (ref.) | C | D | E | F | G | H |
|---|---|---|---|---|---|---|---|---|
| Polyfast PF 3562 | 108.6 | 108.6 | 108.6 | 108.6 | 108.6 | 108.6 | 108.6 | 108.6 |
| Isofast IF 3462 T | 51.6 | 54.4 | 57.2 | 59.9 | 62.7 | 63.7 | 64.7 | 65.7 |
| Carbowax MPEG500 | 7 | 7 | 7 | 7 | 7 | 10 | 13 | 16 |
| NCO-index | 90 | 95 | 100 | 105 | 110 | 110 | 110 | 110 |
| Cure time (s) | 210 | 200 | 215 | 225 | 225 | 235 | 240 | 240 |
| TVOC (ppm) VDA 278 | 480 | 510 | 460 | 460 | 430 | 450 | 460 | 440 |
| TFOG (ppm) VDA 278 | 310 | 300 | 260 | 190 | 140 | 160 | 190 | 210 |
| Rubbery feel[1] | -- | - | 0 | + | ++ | ++ | ++ | ++ |
| Flexural Modulus (MPa) ASTM D790 | 12 | 20 | 27 | 35 | 43 | 35 | 30 | 23 |

[1]ranges from -- (very bad rubbery touch, very plastic-like feeling) to ++ (very good leather- or skin-like feeling)

From Table 3 it can be seen that the increase in NCO-index leads to lower emissions and more clearly to lower fogging values, and that it gives rise to a better touch with regard to "rubbery feel". Although this rubbery feel is a subjective evaluation, the effect is so clear between the extremes of the evaluated NCO-indices that it can be evaluated by anyone skilled in the art.

However, by increasing the NCO-index, cure times increase slightly but more importantly the flexural modulus increases drastically, even when using a certain amount of flexibiliser. To counter this effect, extra flexibilizer can be added but this has again a negative impact on curing for the aliphatic skin (see example H versus E).

EXAMPLE 4

In example H of Table 3 a low flexural modulus can be obtained for an aliphatic PU skin even at a high NCO index by adding a high amount of flexibiliser. As explained hereabove, the cure time hereby increases to 240 seconds. In order to limit this cure time increase, this aliphatic PU skin layer can be sprayed according to the invention in a thinner layer after which a second, aromatic layer is sprayed (in a same way as in Example 1).

TABLE 4

Fogging and emission values and cure times of composite skins.

|  |  | H[4] (compar. example) | I[4] | J[2] |
|---|---|---|---|---|
| Layer 1 (aliphatic) | mm | 1 | 0.4 | 0.4 |
| Layer 2 (aromatic) | mm | 0 | 0.6 | 0.6 |
| Cure time | s | 240 | <180[3] | >180[3] |
| TVOC (VDA 278) | ppm | 440 | 200 | 85 |
| TFOG (VDA 278) | ppm | 210 | 90 | 40 |
| Rubbery feel[1] |  | ++ | ++ | ++ |
| Flexural Modulus (ASTM D 790) | MPa | 23 | 16 | 16 |

[1]ranges from -- (very bad rubbery touch, very plastic-like feeling) to ++ (very good leather- or skin-like feeling)
[2]the first (aliphatic) layer only contains a Bi catalyst (same amount as in examples H and I). The Sn-catalyst was not added.
[3]total cure time after stop spraying the first (aliphatic) layer. Values smaller than 180 s were not determined more exactly since it took 180 s to spray and cure the aromatic layer. For example J the aliphatic layer was not yet entirely cured after 180 s.
[4]the aliphatic layer in examples H and I contains as well a Bi catalyst as a Sn catalyst in a comparable amount.

By producing a composite skin (Example I) not only the cure time is decreased (<180 s versus 240 s), but as can be seen from Table 4, also the emission value (TVOC) and fogging value (TFOG) can be reduced in a significant way. Furthermore, as can be seen from example J, even lower emission and fogging values can be obtained by omitting the Sn catalyst in the first (aliphatic) layer. Notwithstanding the fact that the Sn catalyst is omitted in this first layer, the composite skin could be demoulded after 180 s but it appeared that the aliphatic layer was not cured completely yet and that a somewhat longer cure time was needed to achieve a complete curing of this layer.

EXAMPLE 5

TABLE 5

Flexural moduli of the aliphatic and the aromatic PU layer of a composite skin and average flexural modulus thereof.

|  | first skin layer (aliphatic) | second skin layer (aromatic) |
|---|---|---|
| density | 960 kg/m$^3$ | 870 kg/m$^3$ |
| layer thickness | 0.4 mm | 0.6 mm |
| flexural modulus | 25 MPa | 15 MPa |
| Flexural modulus composite skin | 18 MPa | |

This example demonstrates that by providing a sufficiently thin aliphatic skin layer, the composite skin still can be quite flexible by applying a second, aromatic skin layer on the back of the first layer.

EXAMPLE 6

TABLE 6

Leather-like touch obtained by means of an expanded aromatic skin layer underneath a flexible aliphatic skin layer.

|  | first skin layer (aliphatic) | second skin layer (aromatic) |
|---|---|---|
| density | 950 kg/m$^3$ | 350 kg/m$^3$ |
| layer thickness | 0.4 mm | 2.5 mm |
| Shore A |  | 15 |

TABLE 6-continued

Leather-like touch obtained by means of an expanded aromatic skin layer underneath a flexible aliphatic skin layer.

|  | first skin layer (aliphatic) | second skin layer (aromatic) |
|---|---|---|
| flexural modulus | 25 MPa | |
| Schiebe-Effekt of composite skin | | clearly present |

This example shows that combining a flexible first skin layer with a second layer having a low density and a low Shore A hardness, yields a composite skin with a so-called "Schiebe-effect" or a leather-like touch. The density of the aromatic skin layer was reduced by spraying it by means of spray nozzle as disclosed in WO 2005/000481 and by introducing a nitrogen gas in the mixing head to create a froth. Due to this lower density, the aromatic skin layer and the composite skin had a flexural modulus which was even lower than in Example 5, more particularly a flexural modulus of between 5 and 15 MPa.

The invention claimed is:

1. A method for producing a flexible elastomeric composite polyurethane skin having an average areal weight of at least 0.6 kg/m$^2$ and an average flexural modulus, measured in accordance with ASTM D790-03, smaller than 30 MPa, preferably smaller than 25 MPa and more preferably smaller than 20 MPa, which method comprises the steps of:
    providing a first polyurethane reaction mixture;
    spraying a layer of said first polyurethane reaction mixture onto a mould surface to produce a first elastomeric polyurethane layer having a first flexural modulus;
    providing a second polyurethane reaction mixture which comprises at least one aromatic polyisocyanate;
    spraying a layer of the second polyurethane reaction mixture onto at least a portion of the layer of the first polyurethane reaction mixture to produce a second elastomeric polyurethane layer which adheres to the first polyurethane layer and which has a second flexural modulus; and
    removing the composite polyurethane skin comprising the first and the second polyurethane layer from the mould surface after having allowed the first and the second polyurethane reaction mixtures to cure,
wherein
    the first polyurethane reaction mixture is composed of components comprising at least an isocyanate component, isocyanate-reactive components and a catalyst component, the isocyanate component being composed of at least one isocyanate having at least two NCO-groups which are not directly attached to an aromatic group, and the catalyst component being substantially free of lead;
    said first flexural modulus is larger than said average flexural modulus but smaller than 35 MPa;
    said second flexural modulus is smaller than said average flexural modulus; and
    the first and the second polyurethane reaction mixtures are sprayed in such amounts that the first polyurethane layer has a first areal weight larger than 0.1 kg/m$^2$ and the second polyurethane layer a second areal weight larger than 0.3 kg/m$^2$, the ratio between the first and the second areal weight being further selected so that said average flexural modulus is achieved.

2. A method according to claim 1, wherein the spraying of the second polyurethane reaction mixture is started at the latest 90 seconds, preferably at the latest 60 seconds after having stopped spraying the first polyurethane reaction mixture.

3. A method according to claim 1, wherein said first polyurethane layer has an average density of at least 600 kg/m$^3$, preferably of at least 700 kg/m$^3$ and more preferably of at least 800 kg/m$^3$.

4. A method according to claim 1, wherein said second polyurethane layer has an average density of at least 250 kg/m$^3$, preferably of at least 300 kg/m$^3$ and more preferably of at least 350 kg/m$^3$.

5. A method according to claim 4, wherein said second polyurethane layer has an average density of at least 600 kg/m$^3$, preferably of at least 700 kg/m$^3$ and more preferably of at least 775 kg/m$^3$.

6. A method according to claim 1, wherein said second layer has an average density of less than 600 kg/m$^3$, preferably of less than 550 kg/m$^3$ and more preferably of less than 500 kg/m$^3$.

7. A method according to claim 6, wherein said second polyurethane layer has a Shore A hardness, measured in accordance with DIN 53505, smaller than 30, preferably smaller than 25 and more preferably smaller than 20.

8. A method according to claim 1, wherein the second polyurethane reaction mixture is sprayed so that said second average areal weight is larger than 0.4 kg/m$^2$ and preferably larger than 0.5 kg/m$^2$, the first polyurethane reaction mixture being preferably sprayed so that said first average areal weight is larger than 0.2 kg/m$^2$ and preferably larger than 0.3 kg/m$^2$.

9. A method according to claim 1, wherein said first polyurethane reaction mixture contains an organobismuth catalyst and is either substantially free of tin or contains less than 600, preferably less than 400 and more preferably less than 200 ppm tin.

10. A method according to claim 1, wherein the first polyurethane reaction mixture comprises at least one flexibiliser which reduces the flexural modulus of the first polyurethane layer and which comprises at least one isocyanate-reactive group.

11. A method according to claim 10, wherein said flexibiliser comprises one isocyanate-reactive group and optionally one or more further isocyanate-reactive groups which are less reactive than said isocyanate-reactive group so that at least a portion of them do not react with the isocyanate groups during the curing of the first polyurethane reaction mixture, the flexibiliser comprising preferably a monofunctional flexibiliser comprising only one isocyanate-reactive group.

12. A method according to claim 10, wherein said flexibiliser comprises a polyethylene glycol chain, and comprises in particular a polyethylene glycol monoalkyl ether.

13. A method according to claim 10, wherein use is made of an isocyanate component which comprises the reaction product of said flexibiliser with a polyisocyanate for composing the first polyurethane reaction mixture.

14. A method according to claim 1, wherein the isocyanate component and the isocyanate-reactive components of said first polyurethane reaction mixture are allowed to react according to an NCO-index higher than 90, preferably higher than 95, more preferably higher than 100 and most preferably higher than 105, the NCO-index being preferably lower than 120.

15. A flexible elastomeric composite polyurethane skin obtained by the method according to claim 1 and having an average areal weight of at least 0.6 kg/m$^2$ and an average flexural modulus, measured in accordance with ASTM D790-

03, smaller than 30 MPa, preferably smaller than 25 MPa and more preferably smaller than 20 MPa, wherein the composite polyurethane skin comprises a first aliphatic elastomeric polyurethane layer which is substantially free of lead and which has a first average areal weight larger than 0.1 kg/m² and a first flexural modulus larger than said average flexural modulus but smaller than 35 MPa and preferably smaller than 30 MPa; and a second elastomeric polyurethane layer which adheres to the first polyurethane layer, which has a second average areal weight larger than 0.3 kg/m² and a second flexural modulus which is smaller than said average flexural modulus, and which is made of a polyurethane material which is at least partially based on an aromatic isocyanate.

16. A polyurethane skin according to claim 15, wherein the second polyurethane layer is interfacially chemically bonded via urethane bonds to the first polyurethane layer.

17. A polyurethane skin according to claim 15, wherein said first polyurethane layer has a density of at least 600 kg/m³, preferably of at least 700 kg/m³ and more preferably of at least 800 kg/m³.

18. A polyurethane skin according to claim 15, wherein said second layer has an average density of at least 250 kg/m³, preferably of at least 300 kg/m³ and more preferably of at least 350 kg/m³.

19. A polyurethane skin according to claim 18, wherein said second layer has an average density of at least 600 kg/m³, preferably of at least 700 kg/m³ and more preferably of at least 775 kg/m³.

20. A polyurethane skin according to claim 15, wherein said second polyurethane layer has a density of less than 600 kg/m³, preferably of less than 550 kg/m³ and more preferably of less than 500 kg/m³.

21. A polyurethane skin according to claim 20, wherein said second polyurethane layer has a Shore A hardness, measured in accordance with DIN 53505, smaller than 30, preferably smaller than 25 and more preferably smaller than 20.

22. A polyurethane skin according to claim 20, wherein said second polyurethane layer has an average thickness of at least 1 mm, preferably of at least 1.5 mm and more preferably of at least 2.0 mm, the average thickness of the second polyurethane layer being preferably smaller than 15 mm, more preferably smaller than 10 mm and most preferably smaller than 5 mm.

23. A polyurethane skin according to claim 15, wherein the first polyurethane layer has an average thickness smaller than 1 mm, preferably smaller than 0.8 mm and more preferably smaller than 0.6 mm.

24. A polyurethane skin according to claim 15, wherein it contains less than 600, preferably less than 400 and more preferably less than 200 ppm tin, the polyurethane skin being most preferably substantially free of tin.

* * * * *